(12) United States Patent
Takei et al.

(10) Patent No.: US 7,952,735 B2
(45) Date of Patent: May 31, 2011

(54) IMAGE FORMING APPARATUS AND DOCUMENT DISTRIBUTION METHOD

(75) Inventors: Kenichi Takei, Saitama (JP); Norifumi Yamashita, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1037 days.

(21) Appl. No.: 11/473,145

(22) Filed: Jun. 23, 2006

(65) Prior Publication Data

US 2007/0121149 A1    May 31, 2007

(30) Foreign Application Priority Data

Nov. 25, 2005    (JP) ................................. 2005-340563

(51) Int. Cl.
*G06K 15/00* (2006.01)
*G06F 3/12* (2006.01)

(52) U.S. Cl. ...................... 358/1.15; 358/1.13; 358/1.14; 358/1.16; 358/3.28

(58) Field of Classification Search ................. 358/1.12, 358/1.14, 1.16, 453, 1.13, 1.15, 3.28
See application file for complete search history.

(56) References Cited

U.S. PATENT DOCUMENTS

| | | | | |
|---|---|---|---|---|
| 6,827,279 B2 * | 12/2004 | Teraura | ........................ | 235/492 |
| 7,450,253 B2 * | 11/2008 | Kiwada | ........................ | 358/1.14 |
| 7,471,913 B2 * | 12/2008 | Sawada | ........................ | 399/84 |
| 7,628,555 B2 * | 12/2009 | Naota | ........................ | 400/62 |
| 7,821,396 B2 * | 10/2010 | Nakata et al. | ........................ | 340/572.1 |
| 2003/0021470 A1 * | 1/2003 | Kakutani | ........................ | 382/162 |
| 2005/0168766 A1 * | 8/2005 | Troyansky et al. | ........................ | 358/1.14 |

FOREIGN PATENT DOCUMENTS

| | | |
|---|---|---|
| JP | 2002-086862 | 3/2002 |
| JP | A 2002-337426 | 11/2002 |
| JP | 2005-074769 | 3/2005 |
| JP | 2005-111852 | 4/2005 |
| JP | 2005-197835 | 7/2005 |
| JP | 2005-205729 | 8/2005 |

OTHER PUBLICATIONS

Office Action issued in JP Application No. 2005-340563 on Oct. 5, 2010 (with English translation).

* cited by examiner

*Primary Examiner* — Twyler L Haskins
*Assistant Examiner* — Dennis Dicker
(74) *Attorney, Agent, or Firm* — Oliff & Berridge, PLC

(57) ABSTRACT

An image formation apparatus which includes a reader-writer that carries out reading of data from a storage medium provided for paper and writing of data to the storage medium provided for the paper, a document data acquisition section that acquires original document data to be printed on the paper, a determination section that determines whether the paper has the storage medium, and a printing out section that, when it is determined that the paper does not have the storage medium, carries out ordinary printing on the paper on the basis of the original document data, and when it is determined that the paper has the storage medium, carries out printing an image corresponding to the original document data on the paper on the basis of the original document data, and carries out writing and outputting of the original document data to the storage medium provided for the paper.

7 Claims, 10 Drawing Sheets

IMAGE FORMING APPARATUS AND DOCUMENT DISTRIBUTION METHOD

BACKGROUND OF THE INVENTION

1. Field of the Invention

The present invention relates to an image formation apparatus and a document distribution method with which an image can be printed on paper provided with a storage medium; the original document data which is used for the printing can be written in the storage medium provided for the printing paper for distribution to the distribution destination; and from the storage medium provided for the printing paper which is distributed, the original document data can be read, and the image which is reproduced without degradation of the image quality and the color of the original document can be reprinted at the distribution destination.

2. Description of the Related Art

As an art pertaining to a printing apparatus, a copying machine, and a facsimile apparatus that allows an image to be printed on printing paper provided with an IC tag which can record data, an invention titled "print sheet with RFID tag, printer, copy machine and facsimile machine" as given in the Japanese Patent Application Laid-Open No. 2002-337426 has been disclosed.

In the printing work for distributing a printed document to the distribution destination, there may occur a case where the document has to be printed without degradation of the image quality and the color of the image printed, and provided for the distribution destination.

Therefore, a printing apparatus which is capable of printing with the image quality and the color of the image represented by the original document data is required to be disposed in the printing environment of the distributor which prints a document to be distributed.

When a printing apparatus having a high performance cannot be disposed at the distributor, there has occurred such time-consuming problems that an operation of sending and receiving the original document data has to be carried out between the distributor and the distribution destination by data communication through the network or by the use of a storage medium, and a printing apparatus with a high performance that is provided in the printing environment is operated in order to generate a reprinting document with which the image quality and the color of the original document are reproduced.

SUMMARY OF THE INVENTION

Then, the present invention has been made in view of the above circumstances and provides an image formation apparatus and a document distribution method with which an image is printed on paper provided with a storage medium; a distribution document which is generated by writing the original document data as the origin of the printed image is distributed to the distribution destination; and at the distribution destination, the original document data is appropriately read from the storage medium provided for the distribution document to print an image with which the image quality and the color of the original document image is reproduced.

An aspect of the invention provides an image formation apparatus that forms an image on paper for printing out, which includes a reader-writer that carries out reading of data from a storage medium provided for the paper and writing of data to the storage medium provided for the paper, a document data acquisition section that acquires original document data to be printed on the paper, a determination section that determines whether the paper has the storage medium, and a printing out section that, when the paper is determined by the determination section that the paper does not have the storage medium, carries out ordinary printing on the paper on the basis of the original document data acquired by the document data acquisition section, and when it is determined that the paper has the storage medium, carries out printing an image corresponding to the original document data on the paper on the basis of the original document data acquired by the document data acquisition section, and carries out writing and outputting of the original document data acquired by the document data acquisition section to the storage medium provided for the paper.

And another aspect of the invention provides an image formation apparatus that prints out an image on the basis of printed out paper in which the image corresponding to original document data is formed, and for which a storage medium for storing the original document data is provided, which includes a reader that reads the original document data from the storage medium provided for the printed out paper, and a printing out section that prints out the image corresponding to the original document data on the basis of the original document data read by the reader.

And another aspect of the invention provides a document distribution method, which includes: acquiring, by a document acquisition section, original document data that is to be printed on paper; printing out, by a printing out section, an image corresponding to the original document data on the paper on the basis of the original document data acquired by the document acquisition section; writing and outputting, by the printing out section, the original document data acquired by the document data acquisition section to a storage medium provided for the paper to distribute a printing document; reading, by a reader, the original document data from the storage medium provided for the printed out paper at a distribution destination of the printing document; and printing out, by a printing out section, an image corresponding to the original document data on the basis of the original document data read by the reader.

BRIEF DESCRIPTION OF THE DRAWINGS

Embodiments of the present invention will be described in detail based on the following figures, wherein.

DETAILED DESCRIPTION OF THE INVENTION

Hereinbelow, embodiments of the image formation apparatus and the document distribution method of the present invention will be described with reference to the attached drawings.

First Embodiment

Figure 1:
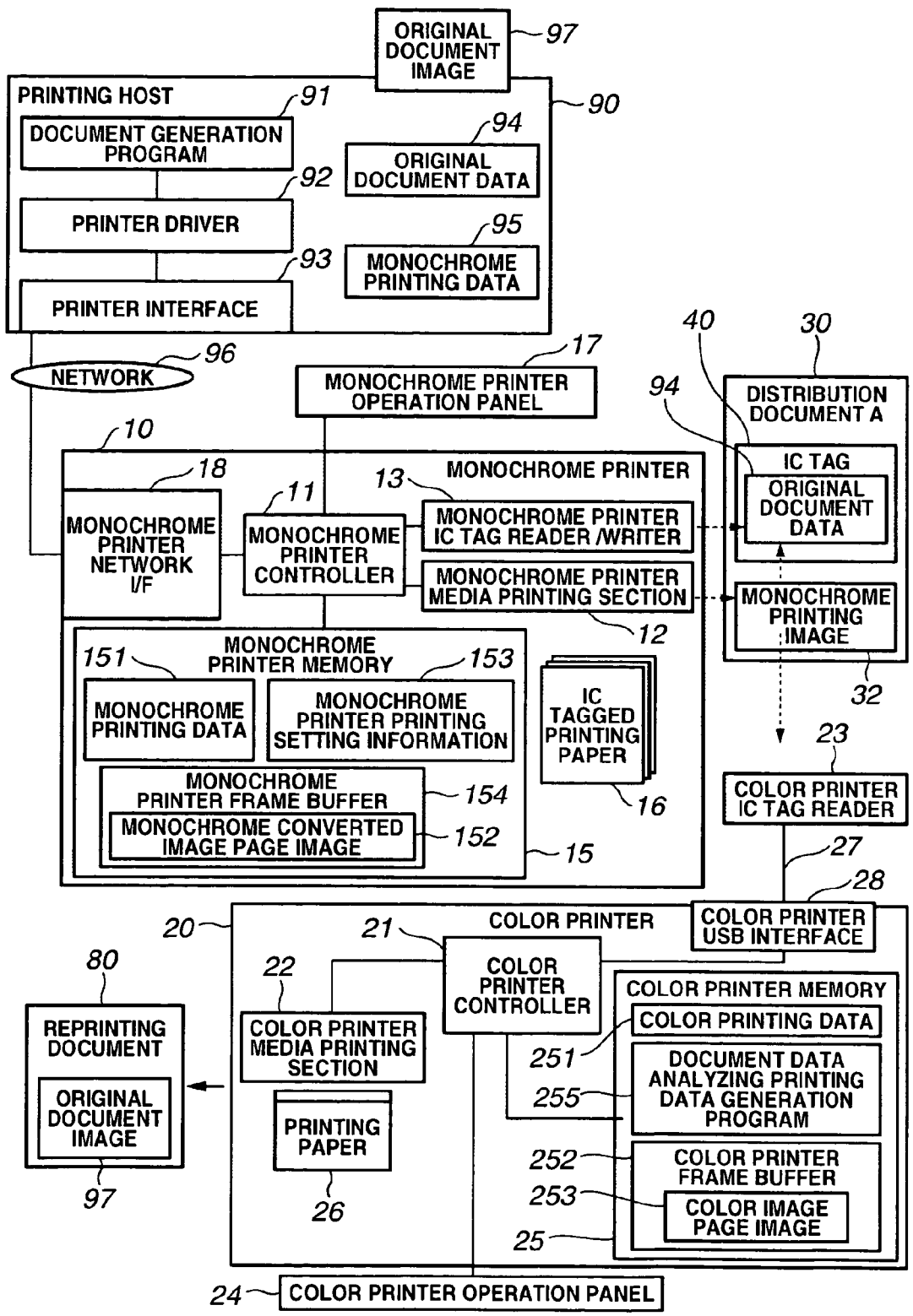
FIG. 1 is a block diagram illustrating a first embodiment of the image formation apparatus and the document distribution method of the present invention.

FIG. 1 is a block diagram illustrating, as a first embodiment of the image formation apparatus and the document distribution method of the present invention, an example in which a distribution document is generated from original document data to be written in an IC tag provided for the distribution document being acquired from a printing host connected to a printer for printing the distribution document.

A printing host 90 uses a document generation program 91 to generate original document data 94 representing an original document image 97; and when a printer driver 92 detects a printing request from the document generation program 91, the printer driver 92 generates, on the basis of the original document data 94, monochrome printing data 95 including a command and image data for printing page that can be analyzed by a monochrome printer 10.

Further, when the printer driver 92 detects a printing request specifying the IC tag writing mode in the monochrome printer 10 in the document generation program 91, the printer driver 92 outputs the original document data 94 generated by the document generation program 91 together with printing data directing processing of writing the data in the IC tag to the monochrome printer 10 connected through a printer interface 93 and a network 96.

In addition, when, in generating monochrome printing data 95 on the basis of the original document data 94, the printer driver 92 analyzes the original document data 94 to find that the original document image 97 is of color, the printer driver 92 generates monochrome printing data 95 for printing the original document image 97 converted into a monochrome printing image 32.

The monochrome printer 10 is controlled with a configuration in which a monochrome printer controller 11 comprehensively controlling the entire monochrome printer 10 is connected to a monochrome printer IC tag reader/writer 13, a monochrome printer memory 15, a monochrome printer operation panel 17, a monochrome printer network interface 18, and a monochrome printer medium printing section 12.

With this configuration, the monochrome printer 10 provides, in addition to the conventional monochrome printing function, a monochrome printing function in the IC tag writing printing mode that carries out writing the original document data 94 providing the origin of a monochrome printing image 32 printed on an IC tagged printing paper 16 to the memory of an IC tag 40 provided in the IC tagged printing paper 16 on which the monochrome printing image 32 is printed. The monochrome printer IC tag reader/writer 13 determines whether an IC tag 40 is provided in the paper on which the image is to be printed and it is in the state where data writing is possible, and if it is in the state where the writing is possible, the monochrome printer IC tag reader/writer 13 carries out processing of writing the original document data 94 providing the origin of the printed monochrome printing image 32 to the IC tag 40 of the IC tagged printing paper 16, and notifies the monochrome printer controller 11 of the result of the writing processing.

Herein, the writing format used when the monochrome printer IC tag reader/writer 13 writes the original document data 94 to the IC tag 40 is a format which is readable by a color printer IC tag reader 23.

The monochrome printer operation panel 17 has a display which displays various operation screens for carrying out a printing operation with data for display from the monochrome printer controller 11; has an input section which includes directional keys for carrying out selection operation from the menus and parameters, functional pushbuttons for implementing specific functions with pushbutton operation, ten keys, and the like on the operation screen displayed by the display; and notifies the monochrome printer controller 11 of the information about the inputting operation that is detected by the input section.

The monochrome printer controller 11 generates, on the basis of the monochrome printing data 95 received from the printing host 90, a monochrome converted-image page image 152 for each printing page that can be processed by the monochrome printer medium printing section 12, developing it into a monochrome printer frame buffer 154.

The monochrome printer memory 15 stores the type of paper set in the paper feed tray provided in the monochrome printer 10, particularly, monochrome printer printing setting information 153 for recording and managing the identification information about the paper feed tray in which an IC tagged printing paper 16 is set.

In addition, the monochrome printer memory 15 has the monochrome printer frame buffer 154 for developing the monochrome converted-image page image 152 generated by the monochrome printer controller 11 therein.

On the other hand, in FIG. 1, a color printer 20 is controlled with a configuration in which a color printer controller 21 comprehensively controlling the entire color printer 20 is connected to a color printer memory 25, a color printer IC tag reader 23, a color printer medium printing section 22, a color printer operation panel 24, and a color printer USB interface 28.

With this configuration, the color printer 20 provides, in addition to the conventional color printing function, a color printing function which color-prints the original document image 97 on the basis of the original document data 94 read from the IC tag 40 provided in the distribution document A.

The color printer IC tag reader 23 is connected to the color printer 20 with a color printer USB interface 28 and a USB cable 27; carries out processing of reading the original document data 94 from the IC tag 40 provided in the distribution document A 30; and carries out processing of notifying the color printer controller 21 of the result of the reading processing under the control of the color printer controller 21.

The color printer controller 21 implements a document data analyzing printing data generation program 255 in the monochrome printer memory 25, thereby, on the basis of the original document data 94 read by the color printer IC tag reader 23, generates color printing data 251 including a printing control command and image data for each printing page that can be analyzed by the color printer controller 21, and on the basis of the generated color printing data 251, develops a color image page image 253 for each printing page that can be processed by the color printer medium printing section 22 into a color printer frame buffer 252.

The color printer medium printing section 22 carries out processing of printing the image on printing paper 26 on the basis of the color image page image 253 developed into the color printer frame buffer 252 by the color printer controller 21.

The document data analyzing printing data generation program 255 generates color printing data 251 including a printing command and image data which can be analyzed by the color printer controller 21 on the basis of the original document data 94 read from the IC tag 40 provided in the distribution document A 30.

The color printer operation panel 24 has a display which displays various operation screens including an operation screen (FIG. 6A) for causing the user to select the processing of color printing in the IC tag reading mode with the data for display from the color printer controller 21; has an input section which includes directional keys for carrying out selection operation from the menus and parameters, functional pushbuttons for implementing allotted specific functions with pushbutton depression, ten keys, and the like on the operation screen displayed by the display; and notifies the color printer controller 21 of the information about the inputting operation that is detected by the input section.

Figure 2:
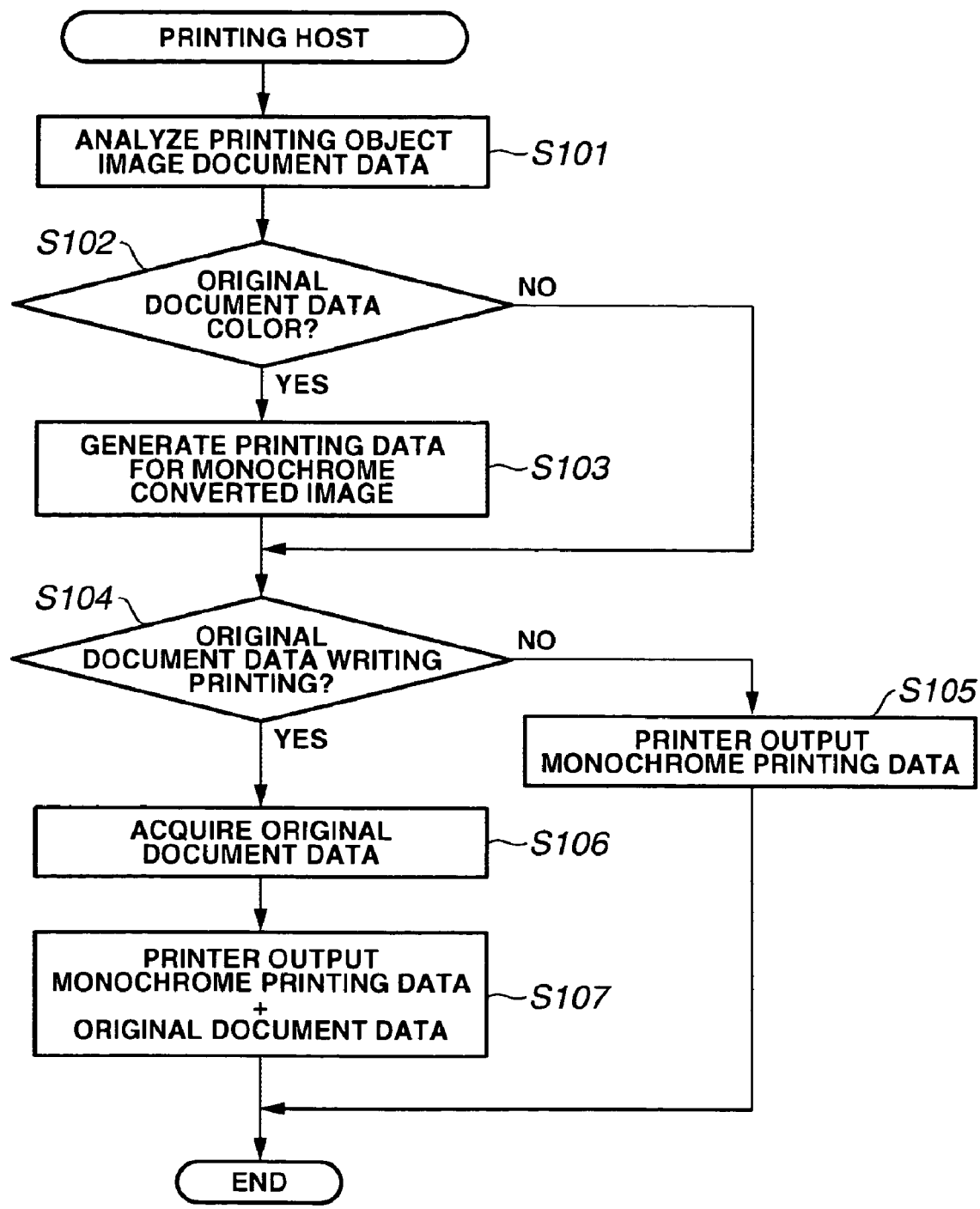
FIG. 2 is a flowchart illustrating an operation example of printing processing by the printing host shown in FIG. 1.
Figure 3:
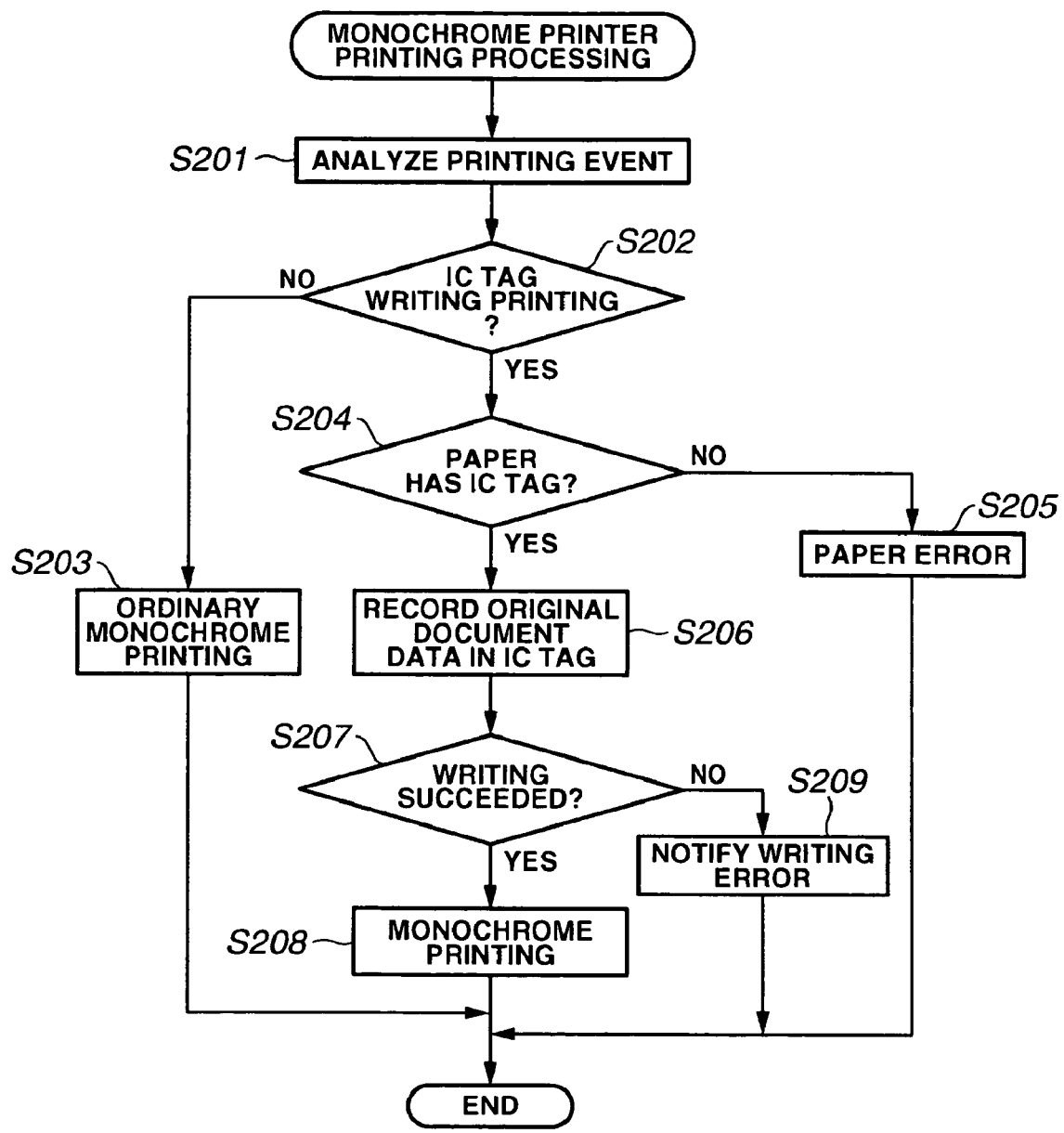
FIG. 3 is a flowchart illustrating the operation of printing processing by the monochrome printer shown in FIG. 1.

Next, operation examples of document distribution processing by the printing host 90, the monochrome printer 10, and the color printer 20 as shown in FIG. 1 will be given in the flowcharts as shown in FIG. 2 and FIG. 3, respectively, for explanation.

FIG. 2 is a flowchart illustrating an operation example of printing processing by the printing host 90.

When the printing host 90 detects a printing request of the monochrome printer 10 from the document generation program 91, the printing host 90 analyzes the original document data 94 for which a printout is requested (S101).

When the original document image 97 is a color image (YES at S102), monochrome printing data 95 for printing after converting a color image into a monochrome image is generated (S103).

When the original document image 97 is a monochrome image (NO at S102), the printing host 90 generates monochrome printing data 95 for printing a monochrome image in the same manner as conventional.

When printing in the IC tag writing mode is specified (YES at S104), the printing host 90 outputs the original document data 94 providing the origin of the monochrome printing data 95 together with the monochrome printing data 95 generated to the monochrome printer 10 through the printer interface 93 (S107).

When printing in the IC tag writing mode is not specified (NO at S104), the printing host 90 outputs only the monochrome printing data 95 to the monochrome printer 10 (S105).

FIG. 3 is a flowchart illustrating the operation for distribution document generation by the IC tag writing printing processing by the monochrome printer 10.

When the monochrome printer 10 receives the monochrome printing data 95 from the printing host 90, the monochrome printer 10 analyzes the monochrome printing data 95 to determine whether it provides monochrome printing in a printing event of the IC tag writing mode using an IC tagged printing paper 16, or a printing event of the ordinary printing mode for printing only the monochrome printing image (S201).

When the printing event is not of IC tag writing printing, but of ordinary printing mode (NO at S202), the conventional monochrome printing processing is carried out (S203).

When IC tag writing printing is to be carried out (YES at S202), the monochrome printer 10 determines whether an IC tag 40 is provided in the paper on which the image is to be printed, and is in the state in which writing the original document data 94 is possible (S204).

When writing the data in the IC tag 40 is possible (S204 YES), the monochrome printer 10 carries out writing the original document data 94 received from the printing host 90 to the IC tag 40 provided in the IC tagged printing paper 16 on which the image is to be printed (S206).

When writing to the IC tag 40 provided in the paper on which the image is to be printed is not possible (NO at S204), error information which notifies that data writing is not possible is sent to the printing host as response data (S205).

When processing of writing the data to the IC tag 40 is successfully carried out (YES at S207), the monochrome printer 10 carries out monochrome printing processing on the basis of the monochrome printing data 95 received from the printing host 90 (S208).

Figure 5A:
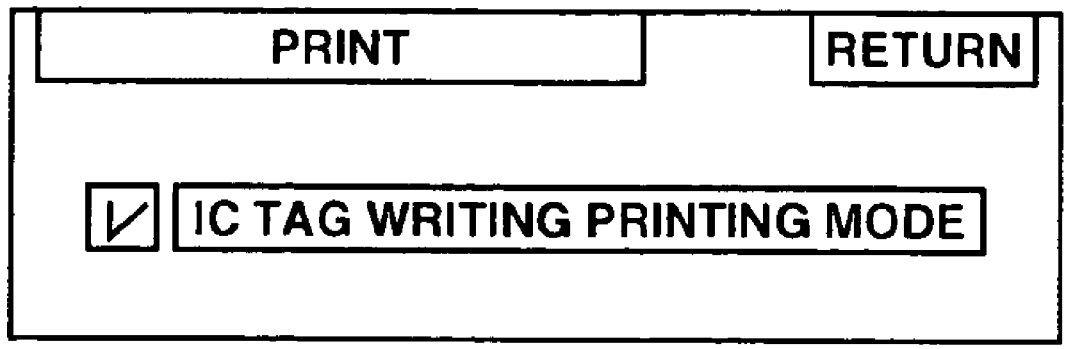
FIG. 5A and FIG. 5B are drawings illustrating display images of the printing operation screen in the document generation program in the printing host.
Figure 5B:
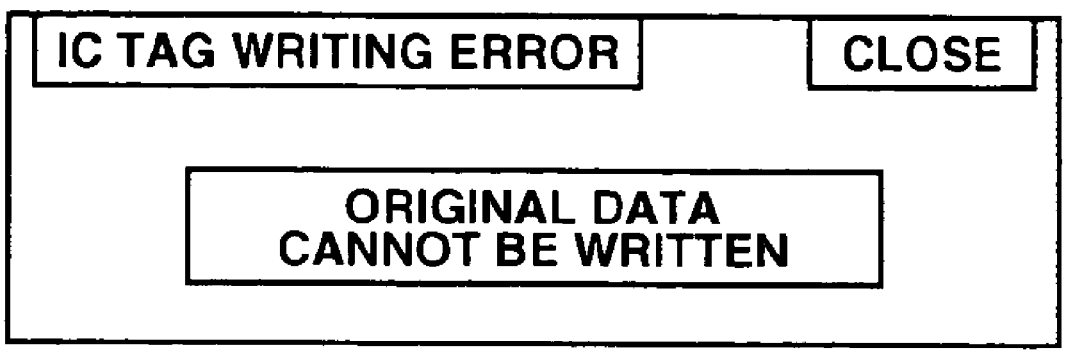

When processing of writing the data to the IC tag 40 is unsuccessfully carried out (NO at S207), the monochrome printer 10 notifies the printing host 90 sending the monochrome printing data 95 of an error in writing to the IC tag 40, and after transmitting processing response data for displaying a screen as shown in FIG. 5B, for example, on the printing operation screen in the document generation program in the printing host 90, the monochrome printer 10 completes the printing processing (S209).

Figure 4:
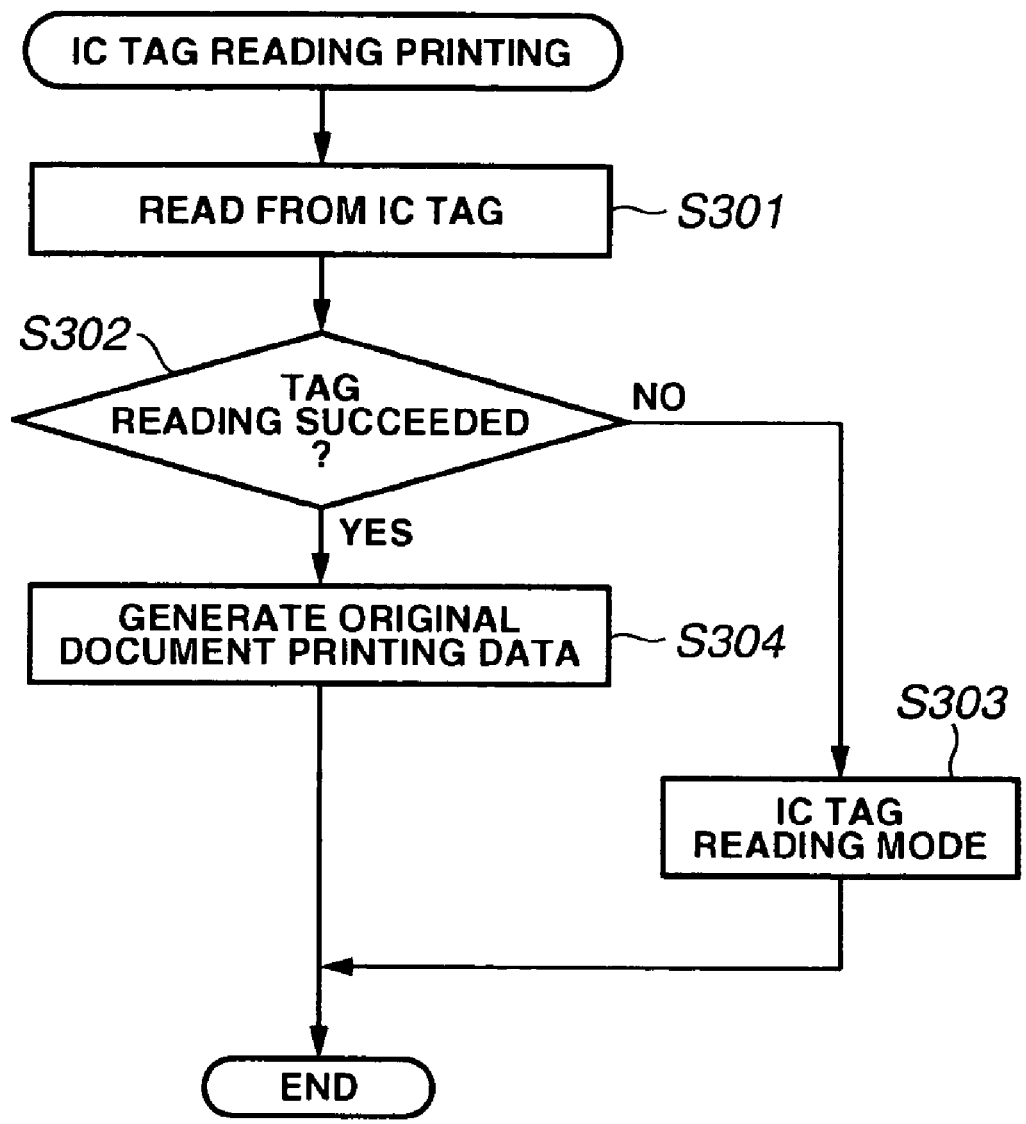
FIG. 4 is a flowchart illustrating the operation of IC tag reading printing processing by the color printer shown in FIG. 1.

FIG. 4 is a flowchart illustrating the operation in the reprinting document generation by the IC tag reading printing processing in the color printer 20.

Figure 6A:
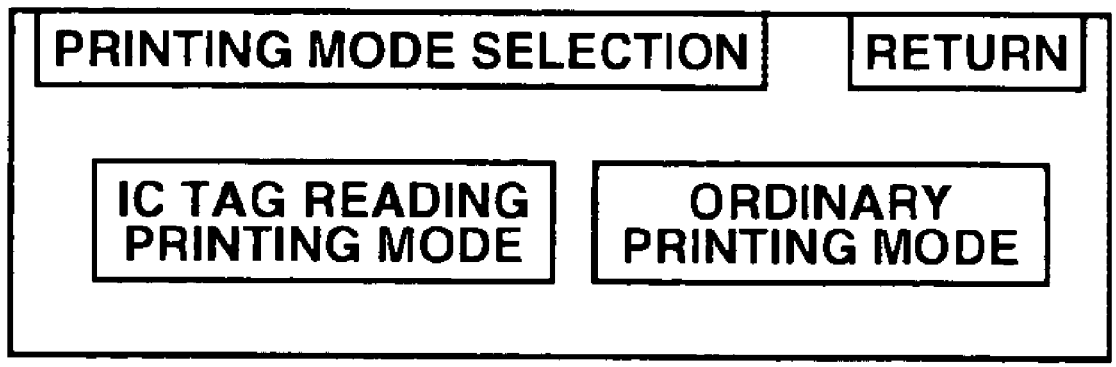
FIG. 6A and FIG. 6B are drawings illustrating display images on the control panel of the color printer in carrying out the IC tag reading printing.

When the reading printing mode for the IC tag 40 provided in the distribution document A 30 generated by the monochrome printer 10 is user-selected on the operation screen as shown in FIG. 6A, for example, that is displayed on the color printer operation panel 24, the color printer 20 carries out processing of reading the original document data 94 recorded in the IC tag 40 in the distribution document A 30 by the color printer IC tag reader 23 (S301).

Figure 6B:
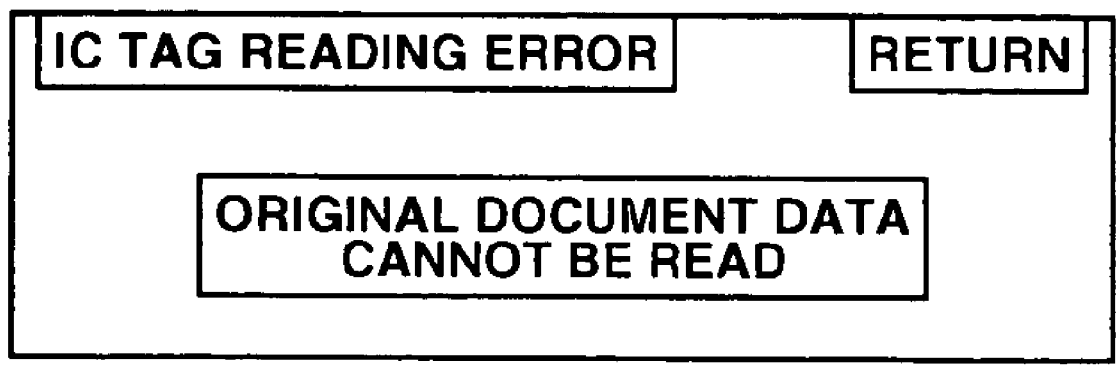

When processing of reading the original document data 94 from the IC tag 40 is unsuccessfully carried out (NO at S302), the color printer 20 displays a message shown in FIG. 6B, for example, on the color printer operation panel 24, reporting that the color printer 20 fails to read the original document data 94 (S303).

When processing of reading the original document data 94 is successfully carried out (YES at S302), the color printer 20 generates a reprinting document 80 on the basis of the original document data 94 read from the IC tag 40 in the distribution document A 30 (S304).

Second Embodiment

Figure 7:
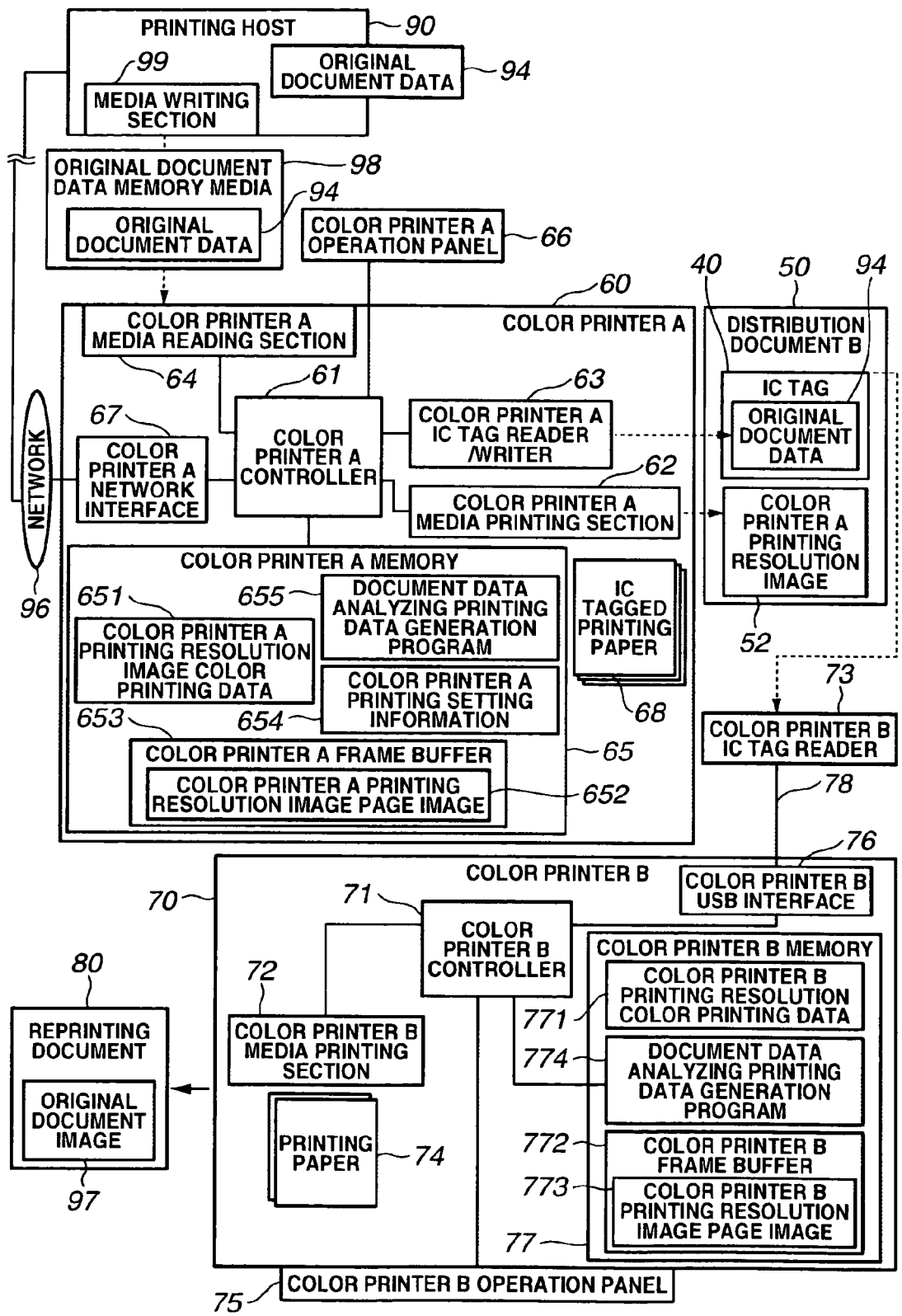
FIG. 7 is a block diagram illustrating a second embodiment of the image formation apparatus and the document distribution method of the present invention.

Next, as a second embodiment of the image formation apparatus and the document distribution method of the present invention, an example in which the original document data to be written in the IC tag of a distribution document is read and acquired directly from a medium 98 in which the original document data is recorded, for printing the distribution document is given in a block diagram as shown in FIG. 7 for explanation.

In FIG. 7, a color printer A 60 installed at a distributor generates printing data for carrying out color printing at the printing resolution for its own apparatus from original document data 94 provided through an original document data memory medium 98; carries out printing processing; and in an IC tag 40 provided in a IC tagged printing paper 68 on which an image is printed, carries out writing the original document data 94 read from the original document data memory medium 98 for generating a distribution document B 50.

Contrarily to this, a color printer B 70 installed at a distribution destination for the distribution document B 50 is capable of color printing at a high resolution without degradation of the generation resolution for an original document image, and has a color printing function in the IC tag reading mode that, on the basis of the original document data 94 read from the IC tag 40 provided in the distribution document B 50, carries out color printing processing with the image quality when the original document image 97 was generated.

The color printer A 60 is controlled with a configuration in which a color printer A controller 61 comprehensively controlling the entire color printer A 60 is connected to a color printer A medium printing section 62, a color printer A IC tag reader/writer 63, a color printer A medium reading section 64, a color printer A network interface 67, and a color printer A memory 65.

With this configuration, the color printer A 60 provides, in addition to the conventional color printing function, a color printing function in the IC tag writing mode that records original document data 94 representing the original document image 97 of an image printed using the IC tagged printing paper 68 in the IC tag 40.

The document data analyzing printing data generation program 655 is stored in the color printer A memory 65, and when implemented by the color printer A controller 61, generates color printer A printing resolution image color printing data 651 on the basis of the original document data 94; and particularly, when the document resolution for the original document image 97 represented by the original document data 94 provides a resolution higher than the printing resolution for the color printer A 60, generates color printer A printing resolution image color printing data 651 for printing a color printer A printing resolution image 52 for which the resolution conversion is carried out to match the printing resolution for the color printer A 60.

The color printer A controller 61 generates color printer A printing resolution image page image 652 for each printing page on the basis of the color printer A printing resolution image color printing data 651 generated, developing the image into a color printer A frame buffer 653, and for the color printer A medium printing section 62, carries out printing control for causing an image of the color printer A printing resolution image page image 652 developed into the color printer A frame buffer 653 to be formed on the IC tagged printing paper 68.

The color printer A network interface 67 is a communication interface for receiving printing data in carrying out host printing from the printing host 90 connected through the network 96, and carrying out color printing processing.

The color printer A medium reading section 64 reads the original document data 94 recorded in the original document data memory medium 98 under the control of the color printer A controller 61; notifies the color printer A controller 61 of the result of the reading processing; and when the reading is successfully carried out, outputs the read data to the color printer A controller 61.

The original document data memory medium 98 is a recording medium, such as a memory card, a CD-ROM, a USB memory, or the like, in which the original document data 94 including the original document image 97 is stored.

The color printer A control panel 66 has a display which displays various operation screens including an operation screen for color printing in the IC tag reading mode with the data for display outputted from the color printer A controller 61; an input section which includes directional keys for carrying out selection operation from the menus and parameters displayed by the display, function selection pushbuttons allotted with specific functions, ten keys, and the like; and outputs the information about the inputting operation that is detected by the input section to the color printer A controller 61.

The color printer A memory 65 stores the printout settings set for the color printer A 60, and the printout settings specified for the printing data; and particularly, records color printer A printing setting information 654 which provides information including the printing resolution when an image is to be printed by the color printer A, and color printer A printing resolution image color printing data 651 for printing an image which resolution is converted into the printing resolution for the color printer A 60.

In addition, the color printer A memory 65 has a color printer A frame buffer 653 which provides a storage region into which a color printer A printing resolution image page image 652 generated on the basis of the color printer A printing resolution image color printing data 651 is to be developed.

The color printer A medium printing section 62 carries out printing processing for forming an image of the color printer A printing resolution image page image 652 developed into the color printer A frame buffer 653 on the IC tagged printing paper 68 under the control of the color printer A controller 61.

The color printer A IC tag reader/writer 63 checks whether an IC tag 40 is provided for the paper on which an image is to be printed, and is in the state where data writing is possible, and if it is in the state where data writing is possible, the color printer A storage medium reading section 64 carries out processing of writing the original document data 94 read from the original document data memory medium 98 under the control of the color printer A controller 61, notifying the color printer A controller 61 of the result of the writing processing.

Herein, the writing format used when the color printer A IC tag reader/writer 63 writes the original document data 94 in the IC tag 40 is a format which is readable by a color printer B IC tag reader 73.

On the other hand, the color printer B 70 is controlled with a configuration where a color printer B controller 71 which comprehensively controls the entire color printer B 70 is connected to a color printer B USB interface 76, a color printer B memory 77, a color printer B control panel 75, and a color printer B medium printing section 72.

With this configuration, the color printer B 70 provides, in addition to the color printing function by the conventional high resolution, a color printing function in the IC tag reading mode that uses a color printer B IC tag reader 73 connected through a color printer B USB interface 76 and a USB cable 78 for processing of reading the original document data 94 from the IC tag 40 provided for the distribution document B 50, and on the basis of the original document data 94 read, carries out color printing without degradation of the document resolution for the original document image 97.

The color printer B IC tag reader 73 carries out processing of reading the IC tag 40 provided for the distribution document B 50 under the control of the color printer B controller 71, and outputs the result of the data reading processing for the IC tag 40, and the reading of data when the reading is successfully carried out to the color printer B controller 71.

The color printer B control panel 75 has a display which displays various operation screens including an operation screen (FIG. 10D) for causing the user to select the processing of color printing in the IC tag reading mode with the data for display from the monochrome printer controller 11; has an input section which includes directional keys for carrying out selection operation from the menus and parameters on the operation screen displayed by the display, functional pushbuttons for implementing allotted specific functions with pushbutton depression, ten keys, and the like; and notifies the color printer B controller 71 of the information about the inputting operation that has been detected by the input section.

The document data analyzing printing data generation program 774 generates color printer B printing resolution image color printing data 771 which can be analyzed by the color printer B controller 71 on the basis of the original document data 94 read by the color printer B IC tag reader 73 for implementation.

The color printer B controller 71 generates a color printer B printing resolution image page image 773 for each printing page that allows printing without degradation of the document resolution for the original document image 97 on the basis of the color printer B printing resolution image color printing data 771, developing the image into a color printer B frame buffer 772.

The color printer B medium printing section 72 generates a reprinting document 80 by carrying out printing processing for forming an image of the color printer B printing resolution image page image 773 developed into the color printer B frame buffer 772 on a printing paper 74 under the control of the color printer B controller 71.

Next, the operations of document distribution processing with the color printer A 60 and the color printer B 70 shown in FIG. 7 will be described.

Figure 8:
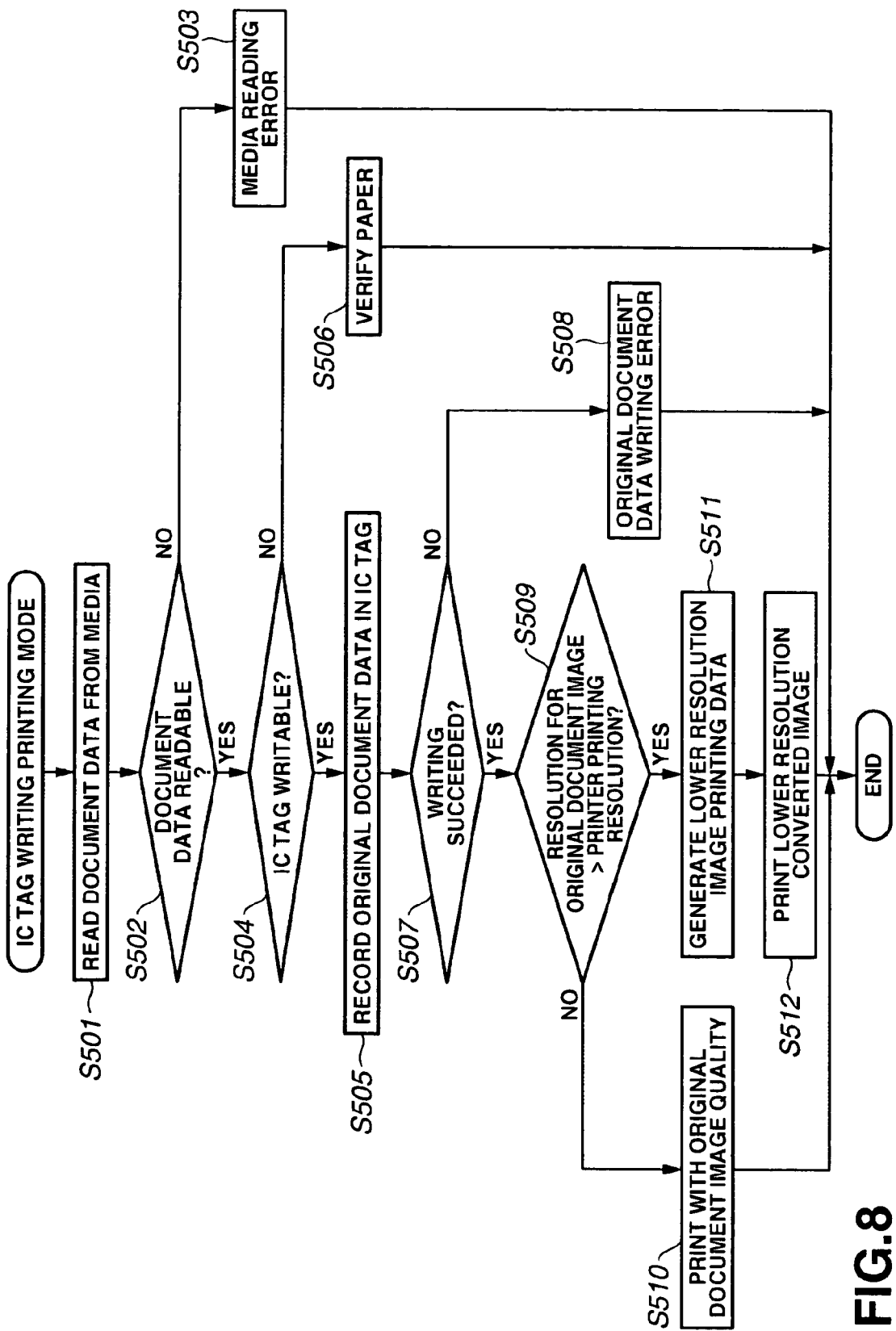
FIG. 8 is a flowchart illustrating an example of the operation of IC tag writing printing processing by the color printer A shown in FIG. 7.

FIG. 8 is a flowchart illustrating the operation of distribution document generation processing in the color printer A.

Figure 10A:
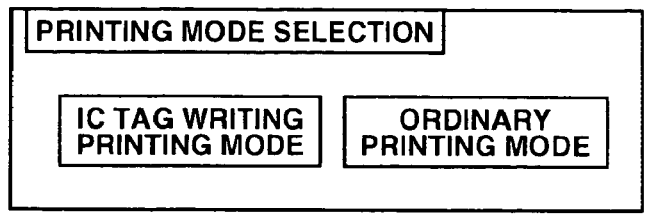
FIG. 10A to FIG. 10E are image drawings illustrating examples of the operation screen and the error message display screen displayed on the control panels of the color printer A and the color printer B.

When, on the operation screen shown in FIG. 10A, for example, in the color printer A control panel 66, the color printing in the IC tag writing mode is user-selected, the color printer A 60 carries out reading of the original document data 94 recorded in the original document data memory medium 98 (S501).

Figure 10B:
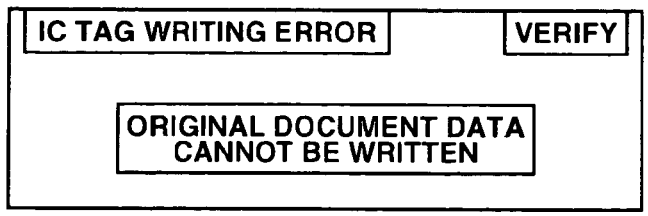

When the color printer A 60 unsuccessfully carries out processing of reading of the original document data 94 from the original document data memory medium 98 (NO at S502), the color printer A 60 outputs an error message shown in FIG. 10B, for example, to the display of the color printer A control panel 66 (S503).

When the color printer A 60 successfully carries out processing of reading of the original document data 94 from the original document data memory medium 98 (YES at S502), the color printer A 60 determines whether an IC tag 40 is provided for the IC tagged printing paper 68 on which the image is to be printed, and the IC tagged printing paper 68 is in the state where writing processing is possible (S504).

When it is impossible to write the original document data 94 to the IC tag 40 (NO at S504), the color printer A 60 displays a message (for example, FIG. 10C) prompting the operator to make a verification of the IC tagged printing paper 68 on the display in the color printer A control panel 66 (S506).

When it is possible to write the original document data 94 to the IC tag 40 (YES at S504), the color printer A 60 writes the original document data 94 read from the original document data memory medium 98 to the IC tag 40 of the IC tagged printing paper 68 (S505).

Figure 10C:
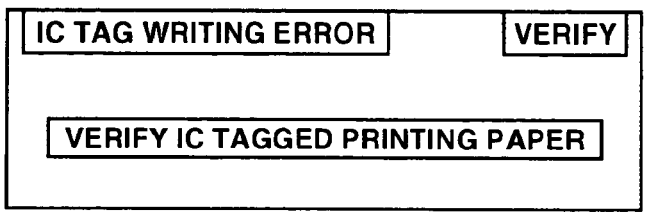

When the color printer A 60 unsuccessfully writes the original document data 94 (NO at S507), the color printer A 60 displays a message as shown in FIG. 10C, for example, notifying of a data writing error on the color printer A control panel 66 (S508).

When the color printer A 60 successfully writes the original document data 94 (YES at S507), the color printer A 60 determines whether the document resolution for the original document image 97 obtained by the original document data 94 read from the original document data memory medium 98 exceeds the printing resolution set in color printer A printing setting information 654 (S509).

When the document resolution provides a resolution lower than the printing resolution (NO at S509), the color printer A 60 generates color printing data 251 based on the original document data 94 and the printing resolution, and carries out color printing with the image quality corresponding to the original document image 97 (S510).

When the document resolution obtained from the original document data 94 provides a resolution higher than the printing resolution that is specified for IC tag writing printing by the color printer A 60 (YES at S509), the color printer A 60 carries out resolution conversion processing to fit the image having the generation resolution obtained on the basis of the original document data 94 to the printing resolution set for the color printer A (S511), and carries out color printing on the basis of the printing data for printing the image for which resolution conversion is carried out (S512).

Figure 9:
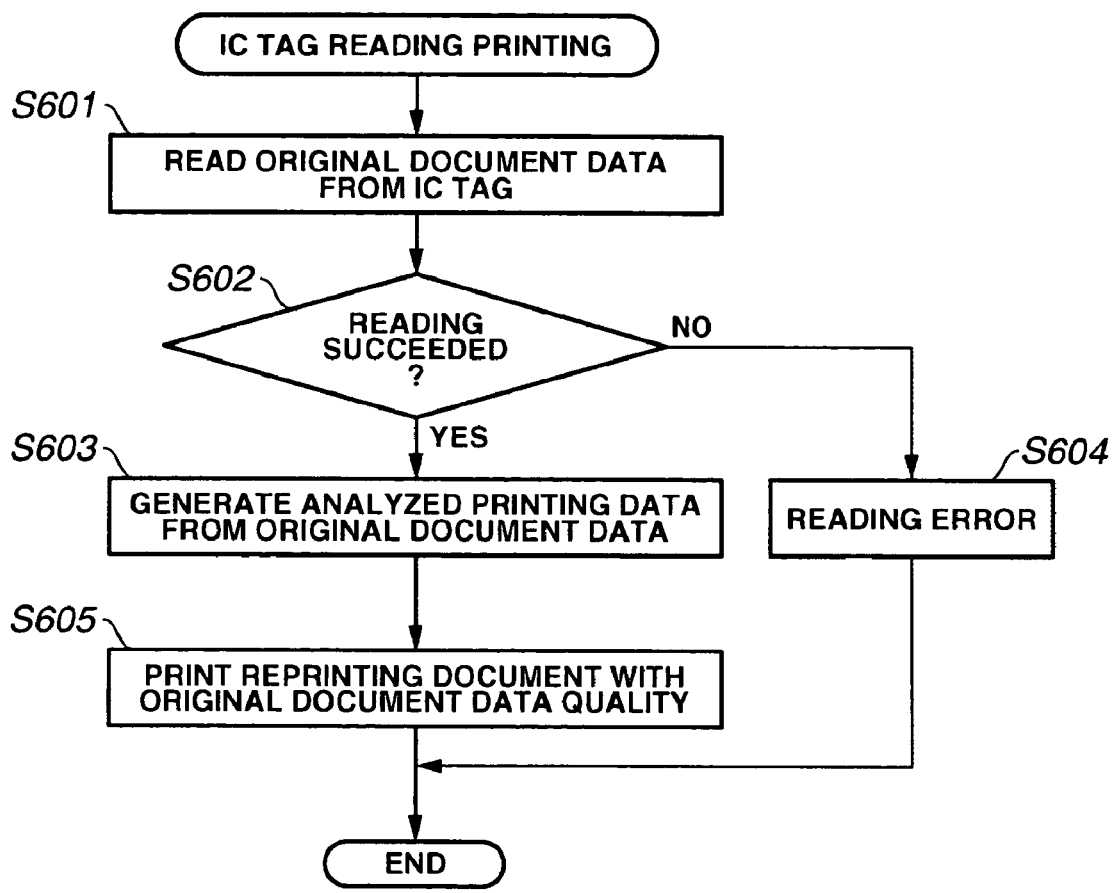
FIG. 9 is a flowchart illustrating an example of the operation of IC tag reading printing processing by the color printer B shown in FIG. 7.

Next, an operation example of reprinting document generation processing by the color printer B 70 will be illustrated in the flowchart as shown in FIG. 9 for explanation.

Figure 10D:
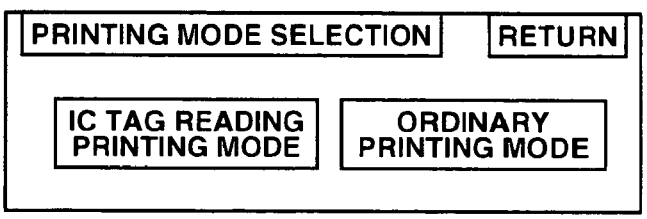

When printing processing in the IC tag reading mode is user-selected on the printing mode selection screen shown in FIG. 10D, for example, the color printer B 70 which has received a distribution document B 50 generated by the color printer A 60 reads the color original document data 94 from the IC tag 40 provided for the distribution document B 50 (S601).

Figure 10E:
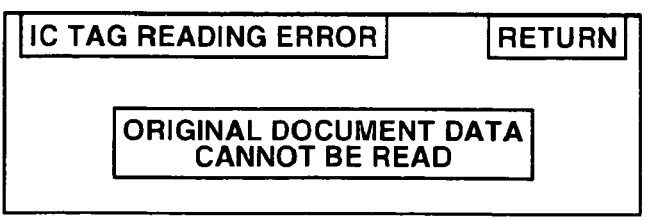

When the color printer B 70 unsuccessfully reads the original document data 94 (NO at S602), it outputs an error message as shown in FIG. 10E, for example, to the display of the color printer B control panel 75 (S604).

When the color printer B 70 successfully reads the original document data 94 (YES at S602), the color printer B 70 carries out color printing with a printing resolution which allows printing without degradation of the generation resolution for the original document data 94 for generation of a reprinting document 80 (S605).

Hereinabove, the First Embodiment and the Second Embodiment have been described, however, the First Embodiment provides one example of solution to the problem of difference in specifications between color and monochrome printers, and the Second Embodiment provides one example of solution to the problem of difference in resolution, but the present invention is not limited to these solutions to the problems of difference, and is intended to widely include solutions to the problems of difference in order to reproduce and redistribute the original document with fidelity.

In the First Embodiment and the Second Embodiment, the system may be adapted such that, when processing of writing the original document data in the IC tag is unsuccessfully carried out, the operator is prompted to make paper verification operation on the IC tagged printing paper, and an operation verification screen which allows the operator to retry the writing processing for the original document data by a prescribed number of times is displayed on the monochrome printer operation panel or the color printer A operation panel.

In addition, the system may be adapted such that, even when writing the original document data in the IC tag cannot be carried out, the user selection operation can determine whether only the processing of printing the image on the IC tagged printing paper is to be forcibly continued, or the printing processing in the IC tag writing printing mode is to be halted.

In addition, when the printer is of a model which has a scanner function and a copying function, providing a section for reading the original image, the IC tag reader which is USB-connected to the printer as the distribution destination for the distribution document may be provided in the inside of the printer such that, in the state in which the image in the distribution document is in the readable position in the original reading section, the original document data can be read from the IC tag provided in the distribution document.

In addition, the system may be adapted such that, when the original document is composed of plural pages, and the memory of the IC tag provided for the IC tagged printing paper has a capacity for recording all pages of the original document data, the original document data and the identification information about the printing pages corresponding to the original document images printed on the distribution document provided with the IC tag in which the original document data is recorded are recorded in the IC tag, and from the IC tag of the distribution document generated, the original document data is read to reprint the original document images of the printing pages of the distribution document; and in addition to this, the operator can specify a desired printing page for reprinting, and specify the number of printing copies.

In addition, the printer to be installed at the distributor or the distribution destination as indicated in the First Embodiment and the Second Embodiment, particularly, the printer at the distribution destination may be of any type, such as laser printer, ink jet printer, or the like, provided that it is a printer which can reprint the original document image without degradation of the color and the image quality (document resolution).

A first aspect of the invention provides an image formation apparatus that forms an image on paper for printing out, which includes a reader-writer that carries out reading of data from a storage medium provided for the paper and writing of data to the storage medium provided for the paper, a document data acquisition section that acquires original document data to be printed on the paper, a determination section that determines whether the paper has the storage medium, and a printing out section that, when the paper is determined by the determination section that the paper does not have the storage medium, carries out ordinary printing on the paper on the basis of the original document data acquired by the document data acquisition section, and when it is determined that the paper has the storage medium, carries out printing an image corresponding to the original document data on the paper on the basis of the original document data acquired by the document data acquisition section, and carries out writing and outputting of the original document data acquired by the document data acquisition section to the storage medium provided for the paper.

A second aspect of the invention provides the image formation apparatus of the first aspect of the invention, in which the original document data may be color document data, and the image that is printed out by the printing out section may be a monochrome printing image corresponding to monochrome printing data converted from the color document data.

A third aspect of the invention provides the image formation apparatus of the first aspect of the invention, in which the original document data may be high resolution document data, and the image that is printed out by the printing out section may be a low resolution converted image corresponding to low resolution printing data converted from the high resolution document data.

A fourth aspect of the invention provides an image formation apparatus that prints out an image on the basis of printed out paper in which the image corresponding to original document data is formed, and for which a storage medium for storing the original document data is provided, which includes a reader that reads the original document data from the storage medium provided for the printed out paper, and a printing out section that prints out the image corresponding to the original document data on the basis of the original document data read by the reader.

A fifth aspect of the invention provides the image formation apparatus of the fourth aspect of the invention, in which the original document data may be color document data, the image that is formed on the printed out paper may be a monochrome printing image corresponding to monochrome printing data converted from the color document data, and the image that is printed out by the printing out section may be a color image corresponding to the color document data.

A sixth aspect of the invention provides the image formation apparatus of the fourth aspect of the invention, in which the original document data may be high resolution document data, the image that is formed on the printed out paper may be a low resolution converted image corresponding to low resolution printing data converted from the high resolution document data, and the image that is printed out by the printing out section may a high resolution image corresponding to the high resolution document data.

A seventh aspect of the invention provides a document distribution method, which includes: acquiring, by a document acquisition section, original document data that is to be printed on paper; printing out, by a printing out section, an image corresponding to the original document data on the paper on the basis of the original document data acquired by the document acquisition section; writing and outputting, by the printing out section, the original document data acquired by the document data acquisition section to a storage medium provided for the paper to distribute a printing document; reading, by a reader, the original document data from the storage medium provided for the printed out paper at a distribution destination of the printing document; and printing out, by a printing out section, an image corresponding to the original document data on the basis of the original document data read by the reader.

According to an aspect of the image formation apparatus and the document distribution method of the present invention, in the printing environment of the party which generates a distribution document and distributes it, the printing operation can be carried out without worrying about the image quality and the color of the image printed by the printing apparatus for generating the distribution document, thus the generation cost for the distribution document can be reduced, and the load of the generation operation for the distribution document can be minimized.

In addition, in the printing environment at the destination to which the distribution document is distributed, the original document data representing the image quality and the color of the original document image can be acquired from the storage medium provided for the distribution document for reprinting it, thus even when a document of which the focus is on the image quality and the color of the image printed on the distribution document is to be handled, reprinting processing can be carried out by making a simple operation of only reading and printing of the distribution document.

The image formation apparatus and the document distribution method of the present invention are available for the distribution document generation operation and the document distribution operation which are required to provide a document to the distribution destination without degradation of the image quality and the color of the original document image, and are effective when the printing environment including the image formation apparatus of the distributor who prints an image from the original document data and the printing environment at the distribution destination for the distribution document have no means for carrying out mutual data communication through the network, and it is difficult to obtain the original document data, and when, in the printing environment of the party which prints the distribution document, an image formation apparatus which is capable of printing without degradation of the image quality and the color of the original document image is not introduced.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-340563 filed on Nov. 25, 2005 including specification, claims, drawings and abstract is incorporated herein by reference in its entirety.

What is claimed is:

1. An image formation apparatus that forms an image on paper for printing out, comprising:
   an interface that receives original document data to be printed on the paper from an external device via a network;
   a mode selection section, configured to allow a user to select between a tag writing mode and an ordinary printing mode, the tag writing mode being a mode to perform a printing control to form the image on the paper with a storage medium while the original document data is written to the storage medium, the ordinary printing mode being a mode to perform a printing control only to form the image on the paper regardless of whether the paper is provided with the storage medium,
   a writer configured to operate during the tag writing mode that performs writing of data to the storage medium provided for the paper;
   a determination section configured to operate during the tag writing mode that determines whether the paper has the storage medium and whether the storage medium can be written to;
   a printing controller configured to operate during the tag writing mode that, when the determination section determines that the paper medium and determines that the storage medium can be written to, controls a printing out section to perform printing of the image on the paper on the basis of the original document data received by the interface, and controls the writer to perform writing of the original document data received by the interface to the storage medium provided for the paper, and when the determination section determines that the storage medium cannot be written to, exits the tag writing mode: and
   a conversion unit that automatically converts original document data to a resolution available with the image formation without degradation of image quality.

2. The image formation apparatus of claim 1, wherein when the determination section determines that the paper has the storage medium, the printer controller generates a monochrome printing data from color document data received by the interface as the original document data and controls the printing out section to perform printing of an image on the basis of the generated monochrome printing data on the paper, and further controls the writer to perform writing of the color document data to the storage medium provided for the paper.

3. The image formation apparatus of claim 1, wherein when the determination section determines that the paper has the storage medium, the printer controller converts resolution of the original document data received by the interface to lower resolution and controls the printing out section to perform printing of an image on the basis of the converted document data having the lower resolution on the paper, and further controls the writer to perform writing of the original document data received by the interface to the storage medium provided for the paper.

4. A document distribution method, comprising:
   acquiring, by a document acquisition section, original document data that is to be printed on paper, when determined by a determination section, in a tag writing mode, that the paper has a storage medium and whether the storage medium can be written to;
   printing out, by a printing out section, an image corresponding to the original document data on the paper on the basis of the original document data acquired by the document acquisition section;
   writing and outputting, in a tag writing mode, by the printing out section, the original document data acquired by the document data acquisition section to the storage medium provided for the paper distributing, by the printing out section, a printed out document;
   reading, in the tag writing mode, by a reader, the original document data from the storage medium provided for the printed out paper at a distribution destination of the printing document;
   printing out, in the tag writing mode, by a printing out section, an image corresponding to the original document data on the basis of the original document data read by the reader;
   exiting the tag writing mode, when in the tag writing mode and the storage medium cannot be written to, and
   automatically converting original document data to a resolution available with the image formation without degradation of image quality.

5. An image formation method for forming an image on paper for printing out, the paper including a storage medium into which data is writable by a writer, comprising:
   determining, by a mode determination section, between a tag writing mode and an ordinary printing mode according to a detection of a user selection operation between the tag writing mode and the ordinary printing mode, the tag writing mode being a mode to perform a printing control to form the image on the paper with the storage medium while original document data is written to the storage medium, the ordinary printing mode being a mode to perform a printing control only to form the image on paper regardless of whether the paper is provided with the storage medium, determining, by a determination section, whether the paper has the storage medium and whether the storage medium can be written to during the tag writing mode; and when the determination section determines that the paper has the storage medium and determines that the storage medium can be written to, controlling a printing out section to perform printing of the image on the paper on the basis of the original document data received by an interface, and controlling the writer to perform writing of the original document data received by the interface to the storage medium provided for the paper, and when the determination section determines that the storage medium cannot be written to, exiting the tag writing mode by a printing controller.

6. An image formation apparatus that forms an image on paper for printing out, the paper including a storage medium into which data is writable by a writer, the apparatus comprising:

an interface that receives original document data to be printed on the paper from an external device;

a mode selection section, configured to allow a user to select between a tag writing mode and an ordinary printing mode, the tag writing mode being a mode to perform a printing control to form the image on the paper provided with the storage medium while the original document data is written to the storage medium, the ordinary printing mode being a mode to perform a printing control only to form the image on paper regardless of whether the paper is provided with a storage medium, a writer configured to operate during the tag writing mode that performs writing of data to the storage medium provided for the paper;

a determination section configured to operate during the tag writing mode that determines whether the paper has the storage medium and whether the storage medium can be written to;

a printing data generation section that generates printing data on the basis of the original document data in a manner that, when the determination section determines during the tag writing mode that the paper has the storage medium and determines that the storage medium can be written to, if the original document data includes color image data, the color image data is printed out to be a monochrome image, and if the original document data is high resolution image data, the high resolution image data is printed out to be an image of low resolution image data; and a printing controller configured to operate during the tag writing mode that, when the determination section determines that the paper has the storage medium and determines that the storage medium can be written to, controls the writer to perform writing of the original document data to the storage medium provided for the paper, and performs printing of an image having an image quality lower than an image quality of the original document data on the paper on the basis of the printing data generated by the printing data generation section.

7. A document distribution method for distributing a document on which an image is formed, the document being paper including a storage medium into which data is writable by a reader writer, the method comprising:

acquiring from an external device, by an interface, original document data that is to be printed on the paper;

when determined by a determination section, in a tag writing mode, that the paper has the storage medium and whether the storage medium can be written to;

generating, in the tag writing mode, by a printing data generation section, printing data on the basis of the original document data in a manner that, if the original document data includes color image data, the color image data is printed out to be a monochrome image, and if the original document data is high resolution image data, the high resolution image data is printed out to be an image of low resolution image data;

writing, in the tag writing mode, the original document data to the storage medium provided for the paper, exiting the tag writing mode, when in the tag writing mode and the storage medium cannot be written to, and preparing a distribution document that is the paper on which an image having an image quality lower than an image quality of the original document data is printed out by a printing controller on the basis of the printing data generated by the printing data generation section; and when the distribution document has the storage medium with the original document data stored therein, reading by a reader the original document data from the storage medium, and printing, by a reprinting controller, a printing image having the image quality of the original document data on new paper on the basis of the read original document data.

* * * * *